United States Patent
Woolford et al.

(10) Patent No.: US 10,042,093 B2
(45) Date of Patent: Aug. 7, 2018

(54) DIFFUSE REFLECTORS

(71) Applicant: HEWLETT-PACKARD DEVELOPMENT COMPANY, L.P., Houston, TX (US)

(72) Inventors: Lana Woolford, Bristol (GB); Sarwat Amreen Baig, Bristol (GB); Mario Ariosto Matranga, Bristol (GB); Stephen Kitson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 14/786,261

(22) PCT Filed: Apr. 30, 2013

(86) PCT No.: PCT/US2013/038791
§ 371 (c)(1),
(2) Date: Oct. 22, 2015

(87) PCT Pub. No.: WO2014/178837
PCT Pub. Date: Nov. 6, 2014

(65) Prior Publication Data
US 2016/0070037 A1    Mar. 10, 2016

(51) Int. Cl.
*G02B 5/02* (2006.01)

(52) U.S. Cl.
CPC ......... *G02B 5/0284* (2013.01); *G02B 5/0236* (2013.01); *G02B 5/0242* (2013.01); *G02B 5/0268* (2013.01)

(58) Field of Classification Search
None
See application file for complete search history.

(56) References Cited

U.S. PATENT DOCUMENTS

| | | | |
|---|---|---|---|
| 5,691,790 A | 11/1997 | Havens et al. | |
| 7,298,442 B2 | 11/2007 | Bowley et al. | |
| 7,633,581 B2 | 12/2009 | Sikharulidze | |
| 7,939,143 B2 | 5/2011 | Manabe et al. | |
| 8,634,137 B2* | 1/2014 | Powers | G02B 5/0231 359/485.01 |
| 2002/0130994 A1 | 9/2002 | Karman | |
| 2003/0063245 A1* | 4/2003 | Bowley | C09K 19/02 349/115 |
| 2003/0174264 A1 | 9/2003 | Stephenson et al. | |
| 2004/0067210 A1 | 4/2004 | Kuntz et al. | |
| 2007/0126674 A1 | 6/2007 | Doane et al. | |

OTHER PUBLICATIONS

Hijnen et al., Self-Organization of Particles with Planar Surface Anchoring in a Cholesteric Liquid Crystal, Langmuir 2010, 26(16), pp. 13502-13510, published Jul. 21, 2010.*

* cited by examiner

*Primary Examiner* — Derek S Chapel
(74) *Attorney, Agent, or Firm* — HPI Patent Department

(57) ABSTRACT

A process for fabricating a diffuse reflector includes: mixing a fluid that is immiscible in a solution containing mesogens into the solution to create a mixture containing droplets of the fluid suspended in the mixture; depositing a layer of the mixture on a surface; and processing the layer to form a film in a manner such that the droplets of the fluid disrupt alignment of the reactive mesogens in the solution and nucleate defects that propagate through the film. A diffuse reflector may include a first layer of cholesteric material that reflects a first wavelength of light and fluid droplets distributed in the layer to nucleate defects and separate domains.

15 Claims, 3 Drawing Sheets

DIFFUSE REFLECTORS

BACKGROUND

Optically diffuse structures often include a substrate such as a polymer film or a glass plate with a textured surface. These diffuse structures can be made reflective by coating a textured surface with an appropriate layer. Coating a diffuse substrate with a metal such as silver or aluminum, for example, gives a white diffuse reflector. Diffuse reflectors can be made colored by coating with an additional color filter layer that absorbs some of the visible spectrum. However, many applications, such as reflective displays, require that the wavelengths that are not reflected are instead transmitted. The use of a metal reflector layer prevents this.

An alternative reflective coating for a diffuse reflector is a multilayer dielectric mirror, which could be used in place of the metal coating and color filter. Dielectric mirrors are conventionally formed from alternating layers of materials with different refractive indices. In a standard design, the layer thicknesses are set to be a quarter of the wavelength of the desired peak reflection wavelength. Inorganic crystalline materials such as silicon oxide, titanium oxide, tantalum pentoxide, and magnesium fluoride are often used to achieve the required refractive indices, but for the most part, depositing layers of these materials requires vacuum processes such as sputter coating. Each layer may need to be deposited separately and with high accuracy for the thicknesses and properties of the layer, and a typical dielectric mirror design requires at least ten layers, often many more. The fabrication of a dielectric mirror can therefore be slow, expensive, and difficult to implement over large areas because of the need for processing in a vacuum. The resulting structures may also be brittle and thus are not ideally suited for applications that require robust or flexible parts.

Another alternative for a color mirror uses cholesteric polymers. Cholesteric polymers tend to self-organize into chiral periodic structures, and the period of the chiral structure can be matched to the optical wavelength to be reflected. A mirror fabricated using cholesteric polymers has the advantage that the polymers can be solution coated under atmospheric conditions, which may reduce fabrication costs, and the polymers generally form robust flexible films.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Mirror structures involving cholesteric polymers can be difficult to make diffuse because cholesteric films are self-ordering. If the cholesteric polymer is simply coated onto a textured surface, the self-ordering might smooth out distortions that the texture creates. As a result, mirror structures involving cholesteric polymer layers may not be as diffuse as required in some applications. A process for fabrication of a diffuse reflector can introduce droplets of an immiscible fluid, e.g., a gas or a liquid, into a mesogen solution to disrupt the self-ordering tendency of cholesteric films. The mesogen solution may particularly include cholesteric mesogens in a solvent and may be tailored to produce a film that reflects a desired range of wavelengths. Mesogens in general are fundamental units of a liquid crystal that induces structural order in the crystals, and cholesteric mesogens can particularly form helical structures in a liquid crystal. The characteristics of the fluid droplets, e.g., concentration and droplet sizes, can be tailored to create domains with independent mesogen alignment that diffusely scatter reflected light. For example, a fluid that is immiscible in a mesogen solution can be mixed into the mesogen solution to create an emulsion, colloid, or other mixture containing droplets of the fluid suspended in the mesogen solution. The mixture containing the fluid droplets can be deposited as a layer on a substrate and the solvent can be evaporated from the layer and the layer can be otherwise cured. During the evaporation/curing process, the fluid droplets create defects that disrupt the otherwise near-perfect alignment of the reactive mesogen. In particular, the droplets may nucleate disclinations that propagate through the film and separate domains in which mesogens are aligned. These cholesteric domains have differing alignments and collectively scatter the reflected light, so that the resulting film is a diffuse reflector of light having wavelengths that the cholesteric domains reflect. However, other wavelengths that do not reflect from the cholesteric domains may be transmitted through the film without significant scattering.

Figure 1A:
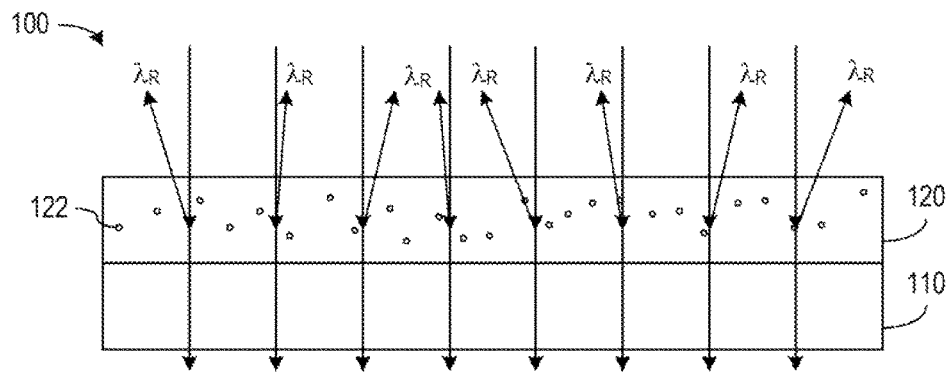
FIG. 1A shows a cross-sectional view of an example of a diffuse mirror using cholesteric material containing fluid droplets to create disclinations separating distinct domains in a liquid crystal structure.

FIG. 1A shows a cross-section of one example of a diffuse reflector 100 including a polymerized layer 120 of cholesteric reactive mesogens on a substrate 110. The cholesteric reactive mesogens in layer 120 have a helical pitch and reflect light that has both a circular polarization corresponding to a handedness of the cholesteric mesogens and a wavelength in a band centered on a specific wavelength $\lambda_R$. To produce diffuse reflection, discrete fluid bubbles or droplets 122 are introduced into layer 120. Droplets 122 may have a size or diameter smaller than the wavelengths of light intended to be reflected or transmitted through diffuse reflector 100 and have a random distribution, so that droplets 122 do not have a significant direct effect on light reflected or transmitted through diffuse reflector 100. Alternatively, droplets 122 may be larger, e.g., as large as or larger than the wavelength of the light reflected or transmitted, particularly if the fluid in droplets 122 has a direct and desired optical effect. For example, droplets 122 may be of a colored fluid, which could be made large enough to adjust the color of the reflected or transmitted light without need of a separate filter being added to the diffuse reflector. Whether or not droplets 122 are large enough to have their own direct optical effects, droplets 122 can cause defects in the structure created by polymerization of the cholesteric reactive mesogens. For example, droplets 122 may be of a fluid immiscible in the mesogen solution and such that interfaces of droplets 122 with the mesogen solution provide a tendency for the reactive mesogens to align parallel or perpendicular to the surfaces of droplets 122, and the difference in alignment conditions at the surfaces of droplets 122 disrupts the self-ordering of the cholesteric reactive mesogens. The resulting polymer/droplet composite 120 diffusely reflects light within a wavelength band centered on wavelength $\lambda_R$.

Droplets 122 are fluid, e.g., gas or liquid, that is immiscible in the solution containing the reactive mesogens that form polymerized layer 120. However, during or after the curing of layer 120, the original fluid in droplets 122 may escape or be intentionally removed from layer 120 leaving a void or another fluid, e.g., air. Also, voids that droplets 122 leave in layer 120 may be filled with another material, which may be fluid or solid in a final product.

FIG. 1A also illustrates white light (or polychromatic light) at normal incidence on diffuse reflector 100. A fraction of the incident light having wavelengths in a band centered on a wavelength $\lambda_R$ that is associated with the helical pitch of the cholesteric reactive mesogens is reflected in layer 120. However, the reflection is diffuse as a result of the randomness in the orientations of cholesteric domains created by the presence of droplets 122 during curing or formation of layer 120. The light not reflected in layer 120 may be primarily transmitted through diffuse reflector 100 without scattering.

Figure 1B:
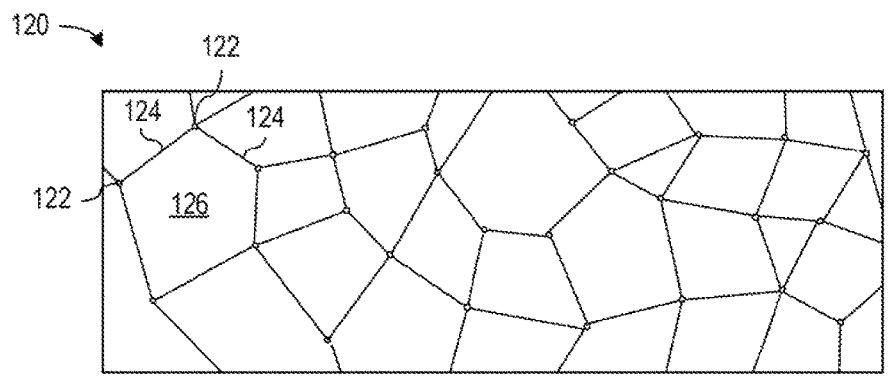
FIGS. 1B and 1C show plan views of examples of diffuse mirrors using the same concentration of droplets in cholesteric material having different helical pitches.

FIG. 1B shows a plan view of layer 120 magnified sufficiently to illustrate the characteristics of layer 120 for reflected light. In particular, droplets 122 create disclinations 124 that separate cholesteric domains 126 in the bulk of cholesteric layer 120. Reactive mesogens in each cholesteric domain 126 are self-ordered so that the helical axes of the reactive mesogens are aligned within the cholesteric domain 126, but the alignment direction varies from one cholesteric domain 126 to the next.

Alignment processes can be used to improve the uniformity of alignment of the cholesteric reactive mesogens within each cholesteric domain 126. One way to improve alignment is to treat or form substrate 110 to define an overall planar alignment direction. For some applications, substrate 110 may be a supporting plastic substrate that is rubbed or buffed to define a planar alignment. Alternatively, substrate 110 can include a polyimide layer that is rubbed or buffed. Adding a thin layer of a reactive mesogen material that does not contain droplets or other alignment disrupting structures on the rubbed (polyimide or substrate) surface can further improve uniformity of alignment of the cholesteric reactive mesogens within each domain 126. The reactive mesogens in the layer added to substrate 110 may not be chiral, so that the added layer may be a planar aligned layer that acts to smooth out any scratches or defects in the rubbed surface of substrate 110. The cholesteric reactive mesogens in layer 120 may thus be more uniformly aligned in each cholesteric domain 126, even though disclinations 124 in layer 120 perturb the alignment direction randomly from one cholesteric domain 126 to the next.

Helical structures in each domain 126 cause reflection by constructive interference of light of wavelength $\lambda_R$ in a specific direction relative to the axis of the helical structure, and each cholesteric domain 126 may have a different characteristic axis for their respective helical structures. Each cholesteric domain generally reflects a range of wavelengths, which may be referred to as the reflective band. The central wavelength $\lambda_R$ of the reflective band for reflector 100 may be given by $\lambda_R = nP \cos \theta$, where n is the average refractive index of the cholesteric material in layer 120, $\lambda_R$ is the wavelength of the incident light, P is the helical pitch of the cholesteric material, and $\theta$ is the angle of the incident light relative to the helical axis in a cholesteric domain. The width of the reflective band primarily depends on the birefringence of the cholesteric material, i.e., depends on the difference of the refractive index $n_e$ for light having a linear polarization parallel to the optical axis of the material and the refractive index $n_o$ of light having a linear polarization perpendicular to the optical axis of the material. The width of the reflective band may further depend on variation in the alignment of the cholesteric domains 126, the thickness of the layer, and the amount of angular diffusion of the incident light.

Figure 1C:
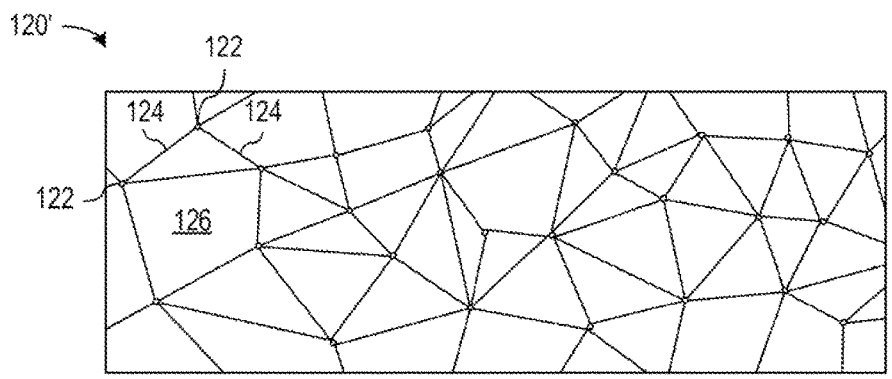

FIG. 1B illustrates disclinations 124 for one concentration of droplets 122 in a cholesteric material having a given helical pitch. Increasing the concentration of droplets 122 in the mixture forming layer 120 generally increases the density of disclinations 124, decreases the size of the cholesteric domains 126, and increases the amount of scattering of reflected light. The density of disclinations 124 and the size of cholesteric domains 126 may also depend on the helical pitch of the cholesteric material. Domains 126 in a typical implementation may be about 2 to 5 μm wide, although this range could be altered depending on factors such as characteristics of the substrate being used and the helical pitch of the cholesteric reactive mesogens. FIG. 1C, for example, illustrates an example of disclinations 124 that may result in a layer 120' of cholesteric reactive mesogens containing the same density of droplets 122 as in the example of FIG. 1B but using a cholesteric material having a shorter helical pitch. In particular, the density of disclinations 124 in FIG. 1C may be higher in a cholesteric material having a shorter helical pitch. The shorter helical pitch of layer 120' of FIG. 1C would also cause diffuse reflector 100 to reflect a shorter wavelength of light than would layer 120 of FIG. 1B.

The characteristics of diffuse reflector 100 are subject to wide variations that permit tailoring of diffuse reflector 100 for many purposes. In particular, the wavelength of light reflected in layer 120 can be selected through selection of a helical pitch of the cholesteric reactive mesogens that are polymerized to form layer 120. A nematic liquid crystal may become cholesteric through addition of a chiral additive, and the helical pitch of the resulting mixture depends on characteristics and the relative concentrations of the liquid crystal and the chiral additive. As a result, the wavelengths reflected by layer 120 can be controlled through selection of the type and concentration of chiral additive. The type of chiral additive, e.g., the handedness of the chiral additive, can also be selected according to the polarization, e.g., the handedness of the circular polarization, to be reflected.

The amount of scattering of reflected light is also selectable through control of the size, type, and concentration of droplets 122. In general, higher concentrations of droplets 122 are more disruptive of the cholesteric structure and cause more scattering of reflected light. In some configurations of diffuse reflector 100, droplets 122 constitute less than 1% of the volume of the solution from which layer 120 is made, but concentrations of droplets 122 may be around 0.3% by volume. In general, the concentration of droplets 122 may vary from about 0.1% by volume to about 1% by volume depending on the cholesteric reactive mesogens and the characteristics such as the size of droplets 122. The concentrations of droplets 122 may also depend on the pitch of the cholesteric reactive mesogens and on the desired angular diffusion of diffuse reflector 100. For example, a cholesteric structure that reflects green light and contains a concentration of 0.3% by volume of droplets of dimension about 1 μm may provide a scattering angle in a range of about 13° to 16°.

Substrate 110 can be selected according to the desired characteristics of the transmitted light. In FIG. 1A, substrate 110 has planar surfaces, and a layer (not shown) on top of layer 120 and providing the same refractive index as the substrate 110 could be added to diffuse mirror 100 to provide transmission with little or no scattering. However, either surface of substrate 110 could be textured if scattering of transmitted light is desired. Substrate 110 can also be transparent to transmit all of the light that is not reflected in layer 120 or be colored, e.g., contain a dye or pigment or have a filter layer to transmit, absorb, or reflect specific wavelengths of light. Substrate 110 could further have a variety of coatings such as an antireflective coating at the interface with layer 120.

Figure 2:
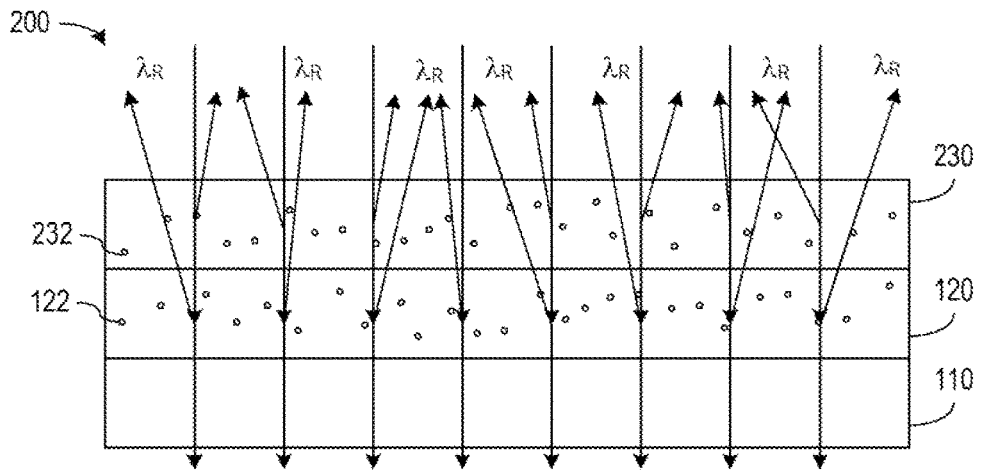
FIG. 2 shows a cross-sectional view of a diffuse mirror using cholesteric layers of opposite handedness.

Diffuse reflector 100 of FIG. 1A has reflectivity that may be limited because a cholesteric material may only reflect one handedness of circularly polarized light. However, a two layer diffuse reflector 200 as shown in FIG. 2 can increase reflectivity by employing a substrate 110 that is coated with a left-handed layer 120 and a right-handed layer 230. If both layers are tailored to reflect light in the same band centered on wavelength $\lambda_R$, the reflectivity of diffuse reflector 200 for unpolarized incident light can be about twice the reflectivity of diffuse reflector 100 for unpolarized incident light. Each layer 120 or 230 can contain droplets 122 or 232 as described above, so that both layers 120 and 230 produce diffuse reflection.

Figure 3:
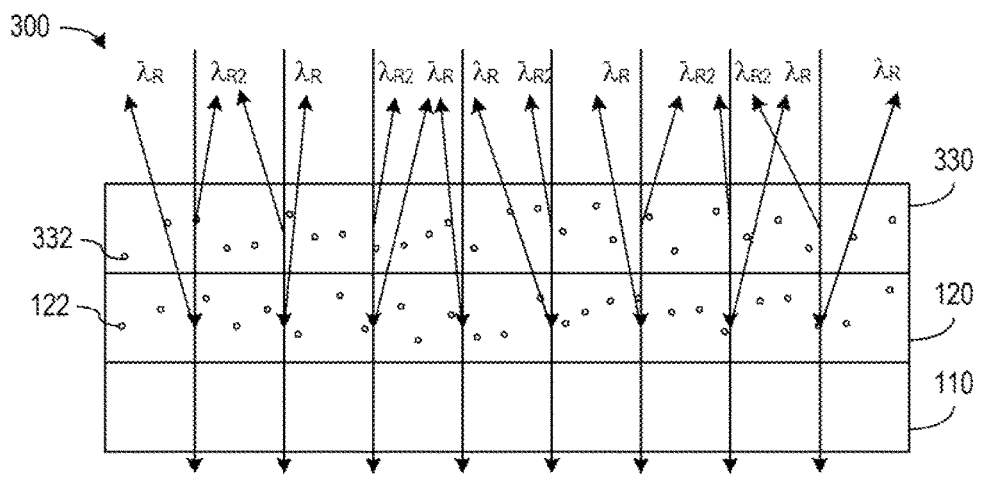
FIG. 3 shows a cross-sectional view of a diffuse mirror using multiple cholesteric layers that respectively reflect different wavelengths of light.

A multilayer diffuse reflector can also be created to diffusely reflect multiple wavelengths of light. FIG. 3, for example, shows a cross-section of a diffuse reflector 300 including a substrate 110 having a first overlying layer 120 containing droplets 122 and a second overlying layer 330 containing droplets 332. Layer 120 can be formed using cholesteric reactive mesogens that provide a helical pitch that reflects a wavelength $\lambda_R$, and layer 330 can be formed using cholesteric reactive mesogens that provide a helical pitch that reflects a wavelength $\lambda_{R2}$. Droplets 122 and 332 in respective layers 120 and 330 cause defects or disclinations creating separate cholesteric domains, which provide diffuse reflection as described above. Diffuse reflector 300 can thus reflect two different colors of light. More generally, a diffuse reflector containing multiple layers of cholesteric reactive mesogens with droplets that disrupt the alignment of the cholesteric reactive mesogens can diffusely reflect multiple wavelengths or ranges of wavelengths of light.

Reflectors 100, 200, and 300 of FIGS. 1A, 2, and 3 as described above can employ droplets that do not have a significant direct effect on light having the wavelengths of interest. For example, droplets 122, 232, and 332 may have diameters or dimensions that are smaller than the shortest wavelength of visible light, e.g., the droplets may have diameters less than about 300 nm for visible light, so that the random placement of the droplets in their respective layers does not have a significant effect on visible light. However, in some configurations, the droplets that create disclinations causing diffuse reflections may also have a direct optical effect on incident light.

Figure 4:
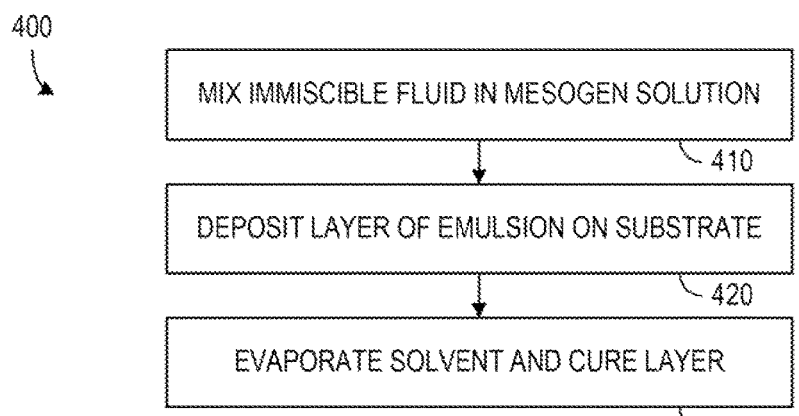
FIG. 4 is a flow diagram of a process for fabrication of a diffuse reflector.

FIG. 4 is a flow diagram of a process 400 for fabricating a diffuse reflective layer. Process 400 begins with a mixing process 410 that mixes a mesogen solution containing reactive mesogens with an immiscible fluid to form droplets in the mesogen solution. The mesogen solution may generally contain any type of mesogen that is suitable for formation of a liquid crystal polymer that reflects a desired wavelength or range of wavelengths of electromagnetic radiation and transmits another wavelength or range of wavelengths of electromagnetic radiation. As noted above, the reactive mesogens may be cholesteric mesogens that form a helix structure with a characteristic pitch that controls optical interference and therefore controls the reflected wavelengths. Some examples of suitable reactive mesogens include ST04180 or 9-(4-(4-Nonyloxyphenylazo)phenoxynonyl)acrylate), ST03952 or (Cholesteryl (4-(6-acryloyloxy-hexyloxy)benzoate) and ST03457 or (4-(6-Acryloxy-hex-1-yl-oxy)phenyl 4-(hexyloxy)benzoate), which are available from Synthon Chemicals. More generally, techniques for selection and mixing of different reactive mesogens are known that can tailor the reactive mesogens to reflect the desired wavelength or range of wavelengths. Such reactive mesogens can be in solution with a solvent such as toluene, methyl ethyl ketone, and cyclopentanone.

Process 410 mixes an immiscible fluid into the mesogen solution to create an emulsion, a colloid, or other mixture containing droplets of the immiscible fluid suspended in the mesogen solution. In general, the immiscible fluid chosen will depend on the solvent used to dissolve the reactive mesogen in the mesogen solution. Examples of immiscible fluid for toluene and similar solvents include air or other gases, oils such as silicone oils, and cross-linkable polymer or organic fluids such as CN111US, CN990, NS CN9800, which are available from Sartomer Europe. When the immiscible fluid is cross-linkable, the fluid may be cross-linkable with itself or the reactive mesogens to form separate polymer regions or cross-linked portions of the polymer layer. The concentration of the immiscible fluid and the mixing process, for example, sonication, together determine the size and number of the droplets in the resulting mixture. Surfactants can also be added to control or alter the size and lifetime of the droplets in the mixture. For example, surfactants such as Polysurf HP or Polysurf HPL, which are available from Addapt Chemicals BV, can be added in a mixture between 1 to 10 mg of surfactant per 1 g total formulation. Some stirring techniques that processes 410 can use to create the droplets suspended in the mixture include sonication, shear mixing, magnetic mixing, or any mixing process that can create droplets of the desired size, e.g., about 0.6 μm to 2 μm. Droplets larger than about 2 μm appear to be forced to the surface, and surface droplets range from 2 μm to 10 μm. The distribution may be a uniform distribution, relatively monodisperse with droplets evenly dispersed throughout the formulation. Sonication, in particular, applies sound (typically ultrasound) energy to agitate a fluid and create a mixture containing droplets of suitable size.

Process 420 then deposits a layer of the mixture on a substrate. The mixture can be deposited by, for example, spin coating or printing on any substrate. In general, the more helical pitches in the layer, the greater the reflectivity, so the thickness of the deposited layer generally depends on the desired reflectivity, the birefringence of the mesogen, and the reflection wavelength. In a typical implementation, a layer of the mixture may be about 1 to 5 μm thick for efficient reflection of visible wavelengths of light.

A wide range of substrates can be used, and the surface underlying the deposited layer does not need to be either rough or perfectly smooth to obtain a diffuse reflector. In general, the underlying substrate may be any supporting substrate such as glass or plastic substrate that is rubbed, buffed, or coated to define an alignment of mesogens and may further include one or more additional optically active layers, e.g., other diffuse reflective layers. Rubbing of the substrate may be unnecessary. Some form of substrate alignment may be desirable depending on how diffuse the reflector needs to be, but the alignment could be a shearing that takes place during the coating process. A typical roll-to-roll coating process may naturally tend to shear the material.

Process 430 cures the deposited layer of emulsion. For example, the mixture may include suitable thermal-initiators or photo-initiators and may be cured using heat and/or UV exposure. Process 430 may include a drying process during which the solvent is evaporated from the layer. The resulting film may still be soft, and process 430 can then cure the film, which cross-links the polymer to form a robust material film. As the solvent evaporates and the film is cured, the fluid droplets are included into the polymer film and disrupt the otherwise near-perfect alignment of the reactive mesogen. If the immiscible fluid includes a cross-linkable compound, the fluid droplets from the mixture may also be cured and become part of the polymer structure of the film or separate polymer structures. If the immiscible fluid is a liquid such as an oil, the oil or other liquid may need to be washed out of the polymer structure or off the surface of the polymer film if later leaking from the polymer would be a problem. For example, a detergent (e.g., Neutracon) can be used to wash silicone oil from a cured polymer film that can then be dried. If desired, the polymer film may be laminated to another structure such as transparent substrate, e.g., plastic or glass, with an optically clear adhesive, e.g., Norland Optical Adhesive 65. Such adhesive may fill voids in the polymer and provide the layer with high transparency for the transmitted wavelength or range of wavelengths. Alternatively, if the polymer film is not laminated on another structure, the top surface of the polymer film may be coated or treated to fill voids on a top surface or elsewhere in or on the polymer film.

In one specific example of process 400, process 410 adds a silicone oil such as poly-(dimethylsiloxane-co-methylphenyl siloxane), which is available from Sigma Aldrich, to a reactive mesogen solution. The concentration of silicone oil may be less than about 1% by volume. In particular, a concentration of about 0.3% may be used but the optimal concentration may depend on factors such as the pitch of the helical structures to be created in the diffuse reflector. The reactive mesogen solution may consist of a mixture of reactive mesogen nematics, e.g., BASF Paliocolor LC242 and BASF Paliocolor 1057, and a reactive mesogen chiral component, e.g., BASF Paliocolor LC756, mixed with photoinitiators, e.g., BASF Irgacure 907 and BASF Irgacure 819, in volatile solvents, e.g., a 20:80 (w/w) mix of isobutyl acetate and 2-pentanone. To aid coating, surfactants, e.g., Dupont zonyl FSO-100, may be added to the formulation. The total solids content may generally be 20-40% in the mesogen solution. A resulting film after curing process 430 would then appear diffuse for reflected light but clear for transmitted light. The color of the reflected light is determined by the pitch of the reactive mesogen which can be tuned by appropriate formulation. The diffuse characteristics are controlled by the distribution of the droplets, e.g., the average concentration of droplets.

The fluid droplets used as described above can be altered during or after the fabrication process. For example, in process 400 of FIG. 4, when the immiscible fluid contains a cross-linkable compound, the process 430 for curing the layer can also cure the fluid droplets to create polymer structures that may or may not be cross linked with the rest of the material in the polymer film.

Figure 5A:
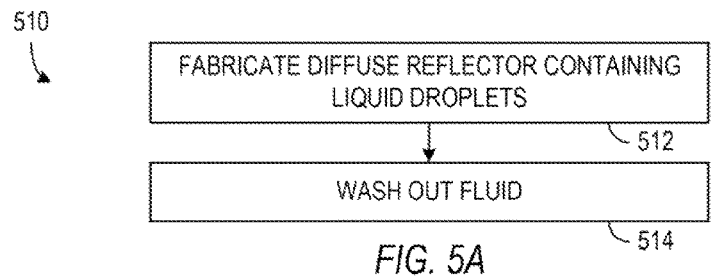
FIGS. 5A, 5B, and 5C are flow diagrams of processes for fabrication of diffuse reflectors using droplets that may be altered during the fabrication processes.

FIG. 5A is a flow diagram of a process 510 that begins with a process 512 of fabricating a diffuse reflective film containing liquid droplets. For example, fabrication process 512 may be the same as process 400 of FIG. 4 in the specific implementation where the fluid droplets remain liquid, e.g., silicone oil, after curing of the mesogens in the layer to form a polymer film. A liquid removal process 514 may then be used to wash the liquid out of some or all of the droplets. For example, oil droplets may be washed out of all or part of a polymer film using a detergent. Washing liquid droplets out of the polymer film may leave fluid droplets filled with a gas, e.g., air, even though liquid droplets were used when the mesogen solution was cured, e.g. during process 430 of FIG. 4.

Figure 5B:
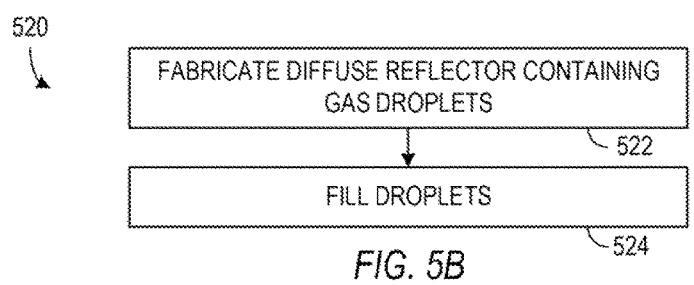

FIG. 5B is a flow diagram of a process 520 that begins with a process 522 for fabricating a diffuse reflective film containing gas droplets. For example, fabrication process 522 may be the same as process 400 of FIG. 4 in the specific implementation where the fluid droplets contain a gas, e.g., air. Alternatively, fabrication process 522 may be the same as process 510 of FIG. 5A, which creates a film containing at least some gas droplets. Process 520 then continues by filling the droplets or replacing the gas in the droplets with another material. For example, the gas droplets may be filled with an adhesive during a process that coats the diffusely-reflective film with adhesive for laminating the film onto another structure.

Figure 5C:
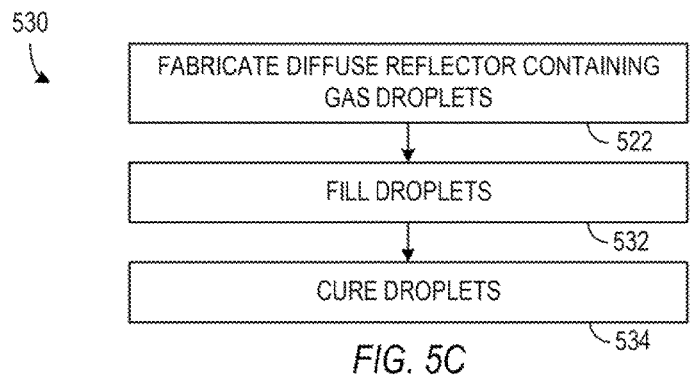

FIG. 5C is a flow diagram of a process 530 that begins with a process 522 for fabricating a diffuse reflective film containing gas droplets as described above with reference to FIG. 5B. Process 530 also includes a process 532 that fills or replaces the gas in the gas droplets with another material, but process 532 fills the droplets with a material such as a liquid containing a cross-linkable compound. Since the liquid containing the cross-linkable compound is added after the layer has been polymerized, the liquid in the droplets after process 532 is not required to be immiscible in the solution containing the original mesogens. A process 534 can then cure the droplets, e.g., using treatment with ultra-violet light or heating, and the curing can cross-link the droplets as separate polymer structures or cross-link the compound in the droplets with the mesogens from the original solution.

The fabrication processes described above may produce a diffuse reflector using a small number of steps that may be performed under atmospheric conditions. The fabrication processes can also provide high reproducibility because the droplet size for a given formulation and mixing process is highly consistent from one fabrication process to another and may produce a durable product with a long shelf life. Further, the process is readily scalable to diffuse reflectors of any area and can be used on a wide range of substrates including flexible plastic films. A wide range of surface textures can be used for the substrate as well.

Figure 6:
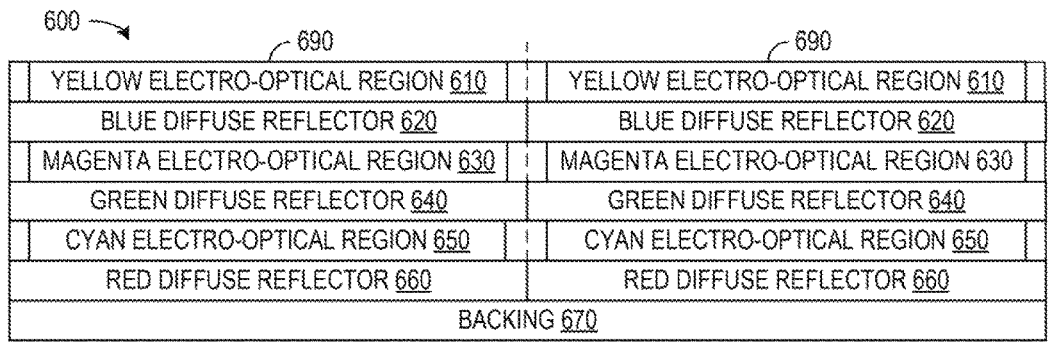
FIG. 6 is a block diagram illustrating a cross-section of a portion of a color reflective display including diffuse reflectors.

FIG. 6 schematically illustrates a cross-section of a portion of a reflective color display 600. Display 600 in general would include an array, e.g., rows and columns, of independently controllable pixels 690, and FIG. 6 shows just two pixels 690 for ease of illustration. In an illuminated environment, each pixel 690 receives ambient light, preferably white light, and reflects back the portion of the incoming light to produce a desired display color for the pixel 690. Each pixel 690 in the illustrated implementation includes multiple electro-optical modulation regions 610, 630, and 650 and multiple diffuse reflectors 620, 640, and 660, and each diffuse reflector 620, 640, and 660 may be fabricated using the processes described above and may have a structure according to any of the specific implementations described above. In particular, diffuse reflectors 620, 640, and 660 may include multiple layers such as shown in the implementation of FIG. 2 to reflect both circular polarizations of light. It may also be noted that while electro-optical filter regions 610, 630, and 650 are separately controlled for each pixel 690 and may include discrete regions or electrical elements for each pixel 690, diffuse reflectors 620, 640, and 660 may extend as continuous layers across the entire area of display 600.

In one particular implementation of a pixel 690, the top electro-optical region 610 is yellow and therefore modulates or absorbs an electrically controlled fraction of the intensity of incident blue light. Diffuse reflector 620 is a blue reflector and beneath region 610, so that blue light does not pass through lower electrodes and electro-optical layers of the pixel 690. As a result, since diffuse reflector 620 reflects blue light, little or no blue light reaches layers 630, 640, 650, or 660, and optical characteristics, e.g., transparency or reflectivity, of layers 630, 640, 650, or 660 for blue light are not constrained.

The rest of the spectrum of incident light, e.g., everything except the blue light absorbed in region 610 or reflected by reflector 620, continues into electro-optical region 630, which modulates green light and may therefore be magenta. However, use of blue diffuse reflector 620 opens up a wider range of options for electro-optical region 630. Electro-optical region 630 needs to modulate the green wavelength band and should not absorb or modulate any wavelengths modulated by underlying electro-optical region 650. However, electro-optical region 630 may absorb any light with the wavelengths assigned to modulation and reflection in layers 610 and 620. For example, electro-optical region 630 could be red instead of magenta. Diffuse reflector 640, which underlies electro-optical region 630, diffusely reflects green light and is transparent to red light, but it does not matter how diffuse reflector 640 affects blue light, since blue light does not reach diffuse reflector 640.

The only constraint on the color of electro-optical region 650 is that electro-optical region 650 should modulate red light through absorption. Electro-optical region 650 can however absorb any amount of green or blue light, as green and blue light have already been filtered out in layers 610, 620, 630, 640. Rather than cyan, electro-optical region 650 could therefore be blue or even black. Diffuse reflector 660 beneath electro-optical region 650 must reflect red light, but the characteristics of diffuse reflector 660 in the blue and green channels do not matter, so diffuse reflector 660 could be a simple broadband diffuse reflector. Backing 670 may be a support structure or electrical backplane for the display 600.

Diffuse reflectors disclosed above may be of particular use in color reflective displays, but are not limited to displays. For example, such diffuse reflectors may be used in surface finishes or product cases (e.g. tablet cases or jackets). As a surface finish, a diffuse reflective finish may be able to hide indicators or displays until the indicators or displays are lit. There is also a wide design space of fluids and mesogens that could be used in reflectors with a wide range of characteristics. Diffuse reflectors or finishes may also be useful for anti-counterfeiting applications because some degree of specialist materials knowledge may be needed to reproduce particular characteristics of a particular diffuse reflector or finish. In particular, the color, light scattering, and polarization properties could give an anti-counterfeiting structure a unique signature that is easy to manufacture but difficult to precisely copy without knowledge of the specific formulation and fabrication process.

Diffuse reflectors may further be of interest to disguise products such as photovoltaic panels. In particular, a diffuse reflector as described above may be able to disguise photovoltaic panels used in portable devices to make the portable devices more attractive or more distinctive without ruining the functionality of the photovoltaic panels. In particular, a diffuse reflector can effectively hide a panel for a range of viewing angles, while the transparent transmission minimizes the loss of optical power. The scalability and relative low costs of diffuse reflectors also make them of interest for high quality glass used in interior design, e.g., balustrades, doors, and privacy panels, where diffuse reflective coatings may be fabricated or laminated on a wide range of glass products.

Although particular implementations have been disclosed above, these implementations are only examples and should not be taken as limitations. Various adaptations and combinations of features of the implementations disclosed are within the scope of the following claims.

What is claimed is:

1. A process for fabricating a diffuse reflector, comprising:
    mixing a fluid that is immiscible in a solution containing a mesogen into the solution to create a mixture including droplets of the fluid suspended in the solution, wherein the fluid is a gas or a liquid suspended in the mesogen solution that creates domains with an independent mesogen alignment;
    depositing a layer of the mixture on a surface;
    processing the layer to form a film such that the droplets of the fluid disrupt alignment of the mesogens that diffusely scatter reflected light and nucleate defects that propagate through the film;
    curing the layer, wherein curing the layer includes removing a solvent used to dissolve the mesogen solution from the layer; and
    replacing the droplets of immiscible fluid in the cured layer with a material transparent for a transmitted wavelength.

2. The process of claim 1, wherein the fluid is selected based on a solvent used to dissolve the mesogen in the solution.

3. The process of claim 1, wherein the droplets of immiscible fluid are replaced with the material comprising a cross-linkable compound.

4. The process of claim 3, comprising curing the cross-linkable compound to form a polymer of the mesogen and of the cross-linkable compound.

5. The process of claim 1, wherein the mesogen comprises a cholesteric material that forms a plurality of domains, and each of the domains comprises a helical structure that reflects a first wavelength of light and that has an axis direction associated with the domain.

6. The process of claim 1, wherein processing the layer comprises forming a polymer film containing the mesogen.

7. A system including a diffuse reflector that comprises:
    a first layer of cholesteric material that reflects a first wavelength of light;
    a plurality of cholesteric domains in the first layer that respectively reflect light having the first wavelength in a plurality of different directions, wherein the plurality of cholesteric domains are separated by disinclinations nucleated at defects associated with immiscible fluid droplets distributed in the first layer, wherein the fluid droplets are a gas or a liquid suspended in a mesogen solution that creates domains with an independent mesogen alignment; and a miscible material in voids previously occupied by the fluid droplets.

8. The system of claim 7, wherein the diffuse reflector further comprises:
a second layer of cholesteric material that overlies the first layer and reflects the first wavelength of light; and
fluid droplets distributed in the second layer as defects associated with disclinations separating a plurality of cholesteric domains in the second layer that respectively reflect light having the first wavelength in a plurality of different directions, wherein the second layer reflects light having a polarization orthogonal to a polarization that the first layer reflects.

9. The system of claim 7, wherein the diffuse reflector further comprises:
a second layer of cholesteric material that overlies the first layer and reflects a second wavelength of light; and
fluid droplets distributed in the second layer as defects associated with disclinations separating a plurality of cholesteric domains in the second layer that respectively reflect light having the second wavelength in a plurality of different directions, wherein the second wavelength differs from the first wavelength.

10. The system of claim 7, wherein the miscible material comprises an adhesive applied as a coating to adhere the first layer to a structure.

11. The system of claim 7, wherein the system comprises a color reflective display containing the diffuse reflector.

12. A system comprising a diffuse reflector that comprises:
a first layer of cholesteric material to reflect a first wavelength of light; and
a plurality of cholesteric domains in the first layer that respectively reflect light having the first wavelength in a plurality of different directions, wherein the plurality of cholesteric domains are separated by disinclinations nucleated at defects associated with immiscible fluid droplets distributed in the first layer, wherein the fluid droplets are a gas or a liquid suspended in the mesogen solution that creates domains with an independent mesogen alignment; and a cross-linkable material in voids left by the fluid droplets after a removal of the fluid droplets by a detergent wash after a curing of the first layer.

13. The system of claim 12, wherein the cross-linkable material is cross-linked with itself.

14. The system of claim 12, wherein the cross-linkable material is a cross-linked cholesteric mesogen.

15. The system of claim 12, wherein the system comprises a color reflective display containing the diffuse reflector.

* * * * *